April 21, 1942.  F. W. BURGER  2,280,746

WHEEL

Filed Nov. 30, 1939  2 Sheets-Sheet 1

INVENTOR.
Frederick W. Burger.
BY Walter E. Schirmer
ATTORNEY.

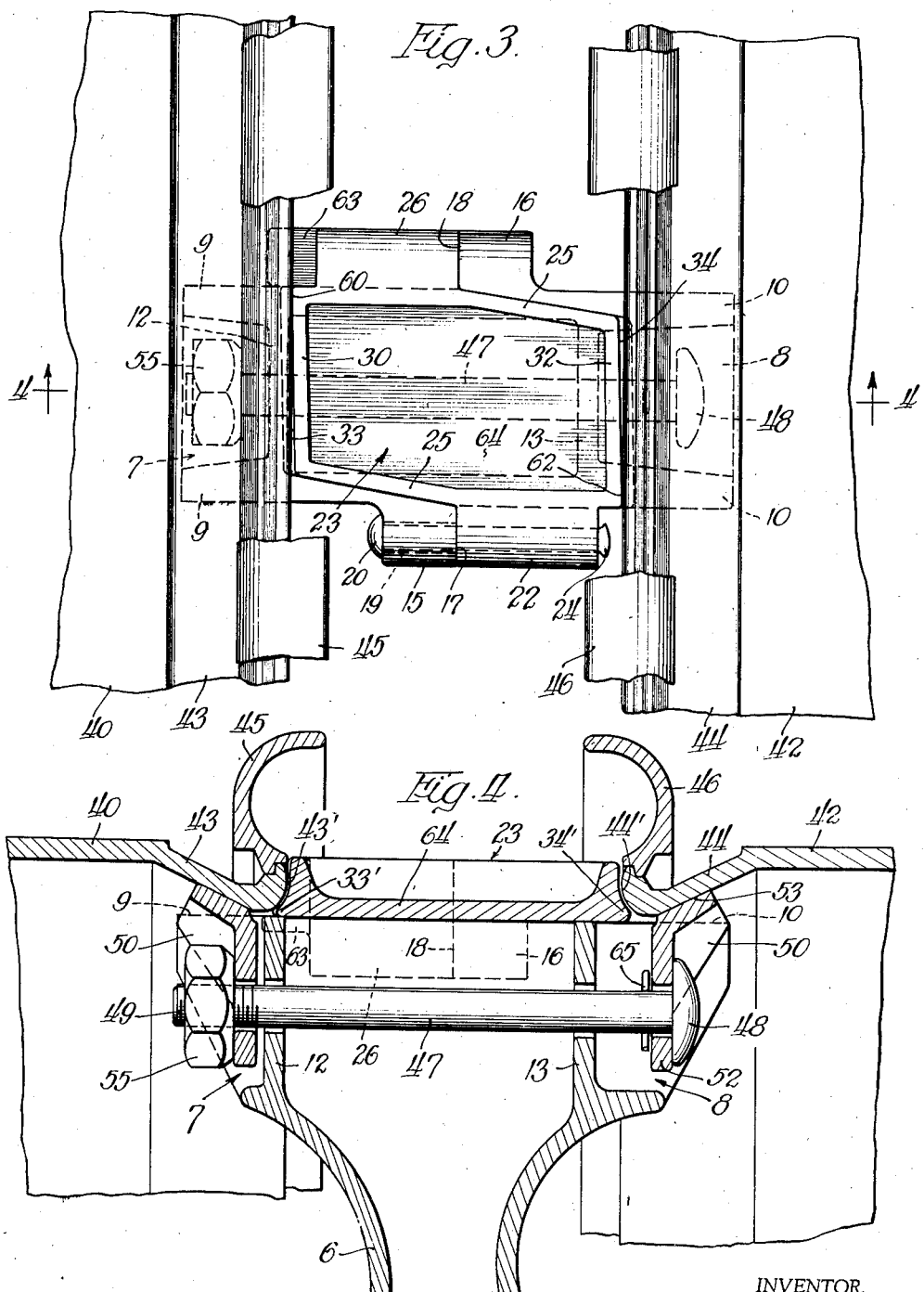

Patented Apr. 21, 1942

2,280,746

UNITED STATES PATENT OFFICE 2,280,746

WHEEL

Frederick W. Burger, Niles, Mich., assignor to Clark Equipment Company, Buchanan, Mich., a corporation of Michigan Application November 30, 1939, Serial No. 306,793

22 Claims. (Cl. 301—13)

This invention relates to wheels, and more particularly is directed to wheels of the dual tire type used in trucks, busses, and other heavy duty vehicles.

Broadly considered, the present invention contemplates improvements in the means for spacing the two tire rims on the wheel body so as to maintain the rims in positive parallel alinement in planes at right angles to the axis of rotation of the wheel body. Numerous attempts have been made to achieve this desired result and have resulted in constructions such as disclosed in my patent, Reissue No. 20,022 of June 30, 1936, which provides for such alinement by the use of positively located central abutments having spacing bands received thereagainst which in turn are engaged by the tire rims.

The present invention departs from this teaching in eliminating the use of spacing bands, the inboard one of which must be expanded to pass over the central abutments and then locked in position on the inboard side of such abutments.

The present invention has as one of its primary objects the provision of spacing blocks at each of the spoke ends of a dual wheel construction, which blocks are hinged to the spoke ends in such manner that they can be swung into position for spacing the two tire rims positively in parallel planes normal to the axis of the wheel body, or can be swung out of position to permit the movement of the inner or inboard rim over the spoke and to the inboard side of the wheel.

Still another important object of the present invention is to provide a construction in which the spacing blocks cannot be displaced from the wheel body, and are at all times in position to facilitate their movement into spacing position on the spoke end and cannot be misplaced or misalined upon the spoke end.

Still another feature of the present invention resides in the provision of oppositely disposed means on the spoke end engaged by the spacing block for positively maintaining the block against axial movement in either direction out of coplanar alinement with the other blocks, which all lie in a plane at right angles to the axis of the wheel body. In this connection it is to be noted that while many attempts have been made in which the inboard wheel can be initially alined into a position so as to extend in a plane at right angles to the wheel body, such attempts, other than disclosed in my patent referred to above, do not retain the tire rim in such positive alinement when clamped in final position but provide only for initial alining means.

Another important advantage of the present invention resides in designing the blocks so that the opposed tire rims engage the blocks at circumferentially spaced points, tending to impose a turning couple on the block which is resisted by fixed abutments adjacent to and substantially in axial alinement with the point of pressure contact between the rim and block whereby the block is positively maintained in position and the rims are positively secured in coplanar alinement.

Still another feature of the present invention is the provision of means on the spacing block engaging under one of the tire rims and preventing displacement of the block when in spacing position.

Another object of the present invention is the provision of a spacing block in which the contact surfaces between the rims and the block are so designed that the block has an axially projecting lip portion extending slightly under the bevel edge of the rim so that when the inboard rim has been placed in position and the block moved to spacing position, the block will form a receiving seat for the rim locating it positively in position and holding it in such position as the clamping means are tightened in position, thereby both initially and finally positively alining this rim in a plane at right angles to the axis of the wheel. The lip also serves the purpose of preventing displacement of the block during assembly of the outboard rim.

Still another feature of the present invention is the elimination of a major portion of the machining required in the central abutment type of wheel and the reduction in cost of the entire assembly inasmuch as the spacing blocks can be formed as castings requiring little or no machining and at a cost less than the cost of rolling the spacing bands heretofore employed.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 3 is an elevational view of a dual wheel assembly using the spacer block shown in Figure 2; and Figure 4 is a sectional view taken substantially on line 4—4 of Figure 3.

Figure 1:
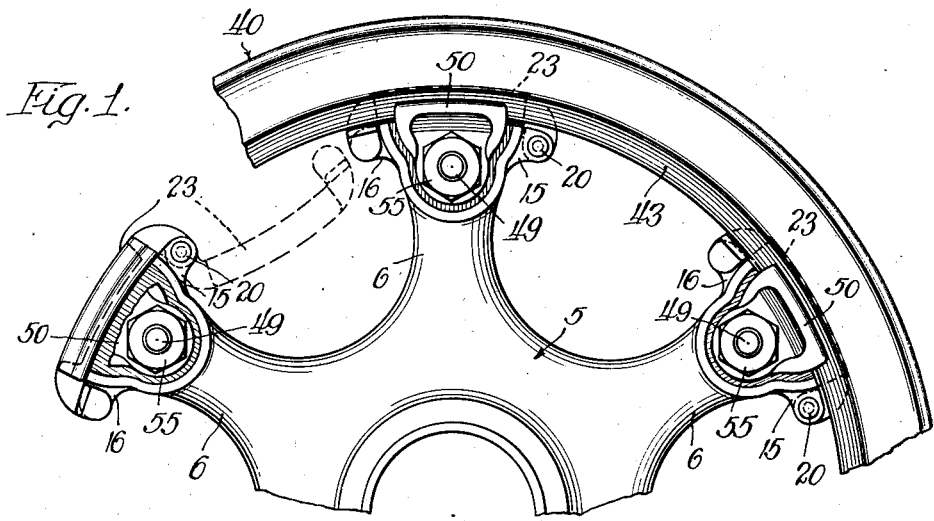
Figure 1 is an elevational view of a portion of a wheel body embodying the present invention.

Referring now in detail to the drawings, the wheel body is indicated generally at 5 and is provided with the radially extending spokes 6 which, in a preferred embodiment of the invention, are of hollow form, and are provided at their outer ends with axially spaced transversely extending U-shaped sockets 7 and 8, which sockets open radially outwardly and are defined by the laterally spaced axially extending seating surfaces 9 and 10, respectively. Each of the sockets 7 and 8 is terminated axially by the radially extending walls 12 and 13.

Intermediate the walls 12 and 13 the spoke end is open radially outwardly, and is provided on opposite sides of the defining walls thereof with integrally formed bosses or abutment portions 15 and 16, respectively, these portions projecting circumferentially and being disposed radially inwardly of the seating surfaces 9 and 10. The bosses 15 and 16 have abutment faces 17 and 18, respectively, which lie in a vertical plane substantially in the center of the wheel body and at right angles to the axis of the wheel. These surfaces 17 and 18 form abutment faces defining the parallel positions of the tire rims in planes paralleling the vertical plane extending through the surfaces 17 and 18.

The boss or abutment projection 15 is preferably provided with a bore 19 adapted to receive the pin 20 with a loose fit therein, the pin 20 extending therethrough and also projecting through the lateral boss portion 22 of a spacer block, indicated generally at 23, the outer end of the pin being headed over as indicated at 24 to provide a pivotal support for hinging the spacer block 23 for rotation about the pin 20 in the plane defined by the surfaces 17 and 18 normal to the axis of the wheels.

Figure 2:
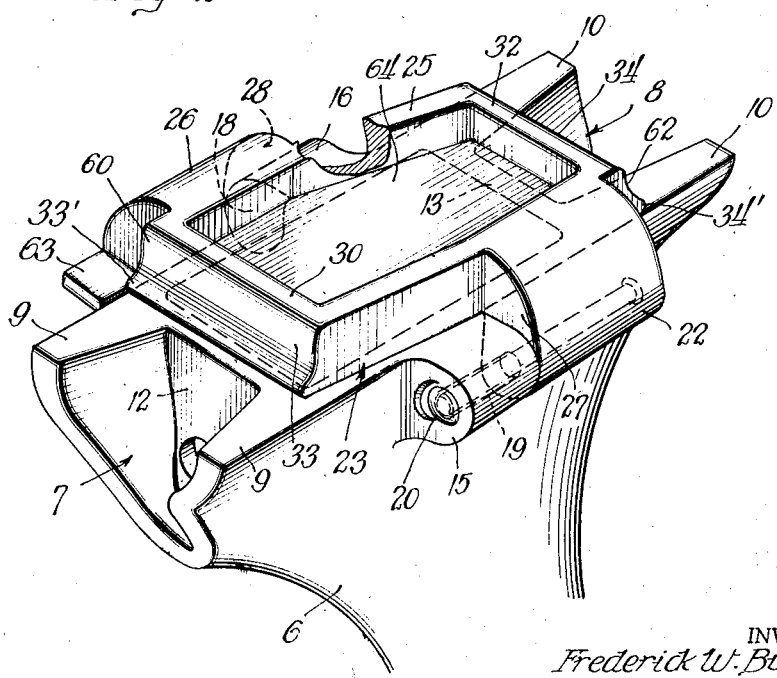
Figure 2 is a perspective view of a spoke end with the spacer block in operative position.

The spacer block 23 comprises a main body portion substantially rectangular in shape and defined by the vertically extending rib or web 25 having the offset boss portions 22 and 26 projecting from opposite sides thereof and extending radially inwardly along the sides of the spoke end. The projection 22 which is hinged about the pin 20 is provided with a planar face portion 27 adapted to have abutment against the abutment face 17 of the projection 15 for limiting axial movement of the spacer block 23 in a direction toward the outboard side of the wheel. Similarly, the projection 26 is provided with an abutment face 28 adapted to engage the abutment face 18 of the integral projection 16 at the end of the spoke for limiting axial movement of the spacer block toward the inboard side of the wheel. It will thus be seen that the spacer block is axially confined by reason of the abutting engagement of the surface 27 against the surface 17 and the surface 28 against the surface 18, thereby maintaining the spacer block in fixed position when rotated to a position such as shown in Figure 2 with respect to the plane passing through the surfaces 17 and 18 normal to the axis of the wheel body. The end ribs or walls 30 and 32 of the body portion of the spacer block 23 are parallel in extent, but are angled slightly with respect to the plane of the surfaces 17 and 18 so as to provide angularly extending contact surfaces 33 and 34, respectively, for a purpose to be described in detail hereinafter.

Considering now the assembly of the rims upon a wheel body of the type thus far described, two similar tire rims 40 and 42 are provided which are of the type having bevel edges or gutters 43 and 44, respectively, in which are disposed the side rings 45 and 46 locked in a conventional manner. Extending through the walls 12 and 13 of the spoke end is the bolt member 47 having the head portion 48 and the threaded end 49. A clamping lug 50 of a type such as shown in my copending patent above referred to has the depending shank 52 receiving the bolt 47, and is provided with lateral wing portions seating on the lug seats 10 at the inboard side of the wheel to accommodate axial movement of the lug 50 within the socket 8. The lug 50 is provided with a wedge surface 53 engaging the radial inner surface of the bevel edge 44 of the rim 42 when the inboard rim 42 is placed in position by moving the same axially over the wheel body with the spacer blocks 23 in the position shown in dotted lines in Figure 1. These spacer blocks can be rotated to such position as the wheel is receiving the inboard rim, and when the inboard rim has once been positioned over several of the spokes, the wheel can be rotated to bring the other spokes uppermost so that the spacer boss can be rotated out of position accommodating movement of the inboard rim into position on the lugs 50.

The spacer blocks are then rotated from the position shown in dotted lines in Figure 1 to the position shown in full lines, overlying the open ends of the spokes and in engagement with the abutment surfaces 17 and 18. In such position, if the rim 42 has a tendency to slide downwardly on the lug surfaces 53, it will engage the surface 34 of the spacer block, and since the surfaces 34 of the block are all in coplanar alinement, the rim 42 will be retained in such coplanar alinement in a plane normal to the axis of the wheel. After the spacer block has been thus positioned with the inboard rim in place, the outboard rim 40 is moved over the wheel body to engage the opposite surface 33 of the spacer block, and lugs 50 at the outboard side of the wheel are moved into position over the lug seating surfaces 9 to engage the beveled edge 43 of the rim for supporting the same in position. The clamping nut 55 is then applied over the threaded end of the bolt 47 and upon tightening of this nut, the lugs 50 are urged toward each other, moving the rims 40 and 42 axially inwardly toward the spacer block and into pressure contact with the respective corners 60 and 62 of the surfaces 33 and 34, respectively.

Due to the angular inclination of the surfaces 33 and 34, substantially single point contact of the rims with the points 60 and 62 is initially effected upon tightening of the clamping means. This tends to produce a rotating couple on the spacer block 23, which would normally tend to rotate the same on the end of the spoke. However, the abutment of the surfaces 17—27 and 18—28 maintain the spacer block against rotation, and since these surfaces are in substantial transverse alinement between the rims and the points of pressure contact, it is obvious that the compressive stress is transmitted directly to these abutment surfaces which are of ample area to withstand substantial clamping pressure sufficient to clamp the rims 40 and 42 positively in position on the spoke ends and in perfect parallel alinement with a plane through the spokes normal to the axis of the wheel. This angular relation of the surfaces 33 and 34 with respect to the lateral edges of the tire rims is of extreme importance in that it localizes the pressure during the clamping action and insures the transmission of this pressure directly to the positive abutment surfaces so as to maintain the desired alinement of the rims and at the same time produce proper spacing of the rims. It will be noticed that the surfaces 33 and 34 are provided with axially projecting lip portions 33' and 34' which extend a slight distance under the curved lateral surfaces 43' and 44' defining the outer lateral edge of the gutters 43 and 44. As a result, the spacing block 23 is maintained against outward displacement, being radially retained by the engagement of the lips 33' and 34' beneath the lateral edges of the rims. However, to insure positive maintenance of the spacer block in position, the depending projection 26 at one end is provided with the normally directed lip 63 which projects beyond the contact surface 33 a distance sufficient so that it will engage under the gutter edge of the rim 40, as clearly shown in Figures 3 and 4.

Preferably, the spacer block 23 is provided with an integral web portion 64 intermediate the defining ribs 25, 30 and 32, which web portion closes the outer end of the hollow spoke so as to prevent the entrance of dirt, gravel, or the like thereinto. The web portion 64 is joined to the ribs by relatively shallow arcuate fillets which insure that there will be no retention of foreign materials in the pocket thus formed, although if desired, the web 64 may be raised to extend across the top of the spacer block providing an inverted pocket over the end of the spoke.

It will be noted that the clamping bolt 47 is provided with the cotter pin 65 which extends therethrough adjacent the shank 52 of the inboard lug 50, retaining this shank between the head 48 and the pin.

It will be seen that with this construction no spacing bands encircling the spokes are required, and the spoke ends may be slabbed or machined to provide the surfaces 9 and 10 in a very economical manner. Similarly, the surfaces 17 and 18 can be formed so as to lie on the parting line of the mold in which the wheel body 5 is cast, and can be accurately held so that little or no machining is required thereon. The spacing blocks 23 are simple castings requiring no coring or the like, which may be very economically manufactured and which do not need any appreciable machining.

Also, it will be apparent that with this construction the space intermediate the spokes is entirely free between the two rims, thereby allowing a free circulation of air therebetween, which is of distinct advantage in cooling the brake drum carried on the inboard side of the wheel body 5, and also in preventing accumulation of mud, stones, snow or the like between the tires or in the spaces between the spokes. This produces a wheel which is relatively clean under all operating conditions and which is very simple in construction and design.

Of course, it is to be understood that the spacer blocks 23 may be made detachable from the wheel body if so desired by merely eliminating the pin 20, and will still serve all the functions desired in the assembled construction, but I desire that they be hinged to the wheel body in most cases so as to prevent their displacement or possible mislocation in the assembly.

I am aware that various changes may be made in certain of the details of the construction herein shown and described, and I therefore do not intend to be limited except as defined by the scope and spirit of the appended claims.

I claim:

1. A wheel comprising a wheel body having radially extending spokes, a spacing block hinged to the end of each spoke operable in one position to overlie the end of the spoke and in another position to lie within the radial extent of the spoke, a pair of tire rims, clamping means carried by the end of the spoke for wedging said rims toward each other against said block when said block is in said one position, and abutment means on said spoke end positively locating said blocks with respect to a plane normal to the axis of the wheel.

2. In combination, a wheel body having radially extending spokes, spacing blocks, transversely extending hinge means between said blocks and spoke ends pivoting said blocks for swinging movement in a plane at right angles to the axis of the wheel body, abutment means engaging said blocks when in a position overlying said spoke ends to maintain them in said plane, a pair of bevel edge tire rims, and transversely movable clamping means at each spoke end for wedging said tire rims into abutment with opposite sides of said blocks, said blocks being movable about said hinged means into a position radially inwardly of said spoke ends.

3. The combination of claim 2 further characterized in that said spacer block has a lip portion adapted to project under one of said rims for preventing displacement of said block when said rims are in position.

4. In combination, a wheel body having radially extending spokes, a spacing block hingedly secured to each spoke end to swing from a position overlying the spoke end into a position between adjacent spokes and radially within the spoke circle, a pair of bevel edge tire rims, lug means for mounting the inboard tire rim on the inboard side of said spoke ends when said blocks are in said last-named position, said blocks being swung to said first-named position to hold said inboard rim against displacement, lug means mounting the other rim on the outboard side of said spoke ends, and clamp means for drawing said lug means toward each other to wedge said rims against said blocks.

5. The combination of claim 4 further characterized in abutment surfaces adjacent said spoke ends engaging said blocks to hold said blocks in a plane at right angles to the axis of said wheel body.

6. In combination, a wheel body having radially extending spokes, spacing blocks hingedly secured to said spoke ends to swing thereabout in a plane normal to the axis of the wheel body, said blocks being movable into one position to allow axial movement of a tire rim over said spoke ends to the inboard side of the wheel body and movable into a second position overlying the spoke ends to form spacing means between a pair of tire rims mounted on said spoke ends, fixed abutment means disposed on the circumferential sides of each spoke end, and engaging abutments on said blocks when in overlying position maintaining said blocks against axial movement in either direction.

7. The combination of claim 6 further characterized in that said radially extending spokes are hollow with open ends, and said blocks have central web portions closing said ends when in overlying position.

8. As a new article of manufacture, a dual rim-receiving wheel body having radially extending spokes, means formed integral with said spoke ends and lying on opposite sides of a central plane through said wheel body normal to its axis providing fixed abutments, and spacing blocks hinged to one of said abutments and rotatable in said plane to overlie the spoke ends and to be maintained against axial movement between said abutments.

9. A wheel body for a dual wheel including radially extending spokes having spoke ends provided with axially spaced transversely extending lug-receiving seats, opposed abutments on opposite sides of the spoke ends intermediate said seats and disposed radially inwardly of said seats, and spacing blocks hinged to one of said abutments and rotatable thereabout into a position overlying the spoke ends intermediate said seats.

10. The wheel body of claim 9 further characterized in that said spacing blocks have integral projections engaging the other of said abutments to maintain said blocks against axial movement.

11. The wheel body of claim 9 wherein said spokes are hollow and open intermediate said seats, and said blocks have central web portions closing said spoke ends when in overlying position.

12. The wheel body of claim 9 further characterized in that said opposed abutments have the faces thereof lying in a common plane normal to the axis of the wheel body, and maintain said blocks against movement axially of said plane when said blocks are in overlying position.

13. In combination, a wheel body having radially extending spokes, axially spaced lug-receiving seats on the ends of said spokes, a spacer block adapted to overlie the spoke end intermediate said seats, tire rims mounted on said seats, lug means on said seats urging said rims toward each other against said block, the points of contact of said rims against said block being circumferentially displaced tending to rotate said block on said spoke end, and means on said spoke ends maintaining said blocks against rotation and in a common plane normal to the axis of the wheel body.

14. A spacer block for a dual wheel comprising a body portion having transversely offset boss portions on opposite sides thereof provided with abutment faces disposed in a common transverse plane, parallel end walls on said body portion extending angularly to said plane, and a web portion interconnecting said boss portions and end walls.

15. The block of claim 14 further characterized in the provision of a lip on one of said boss portions projecting beyond the end wall and disposed below the plane of said web portion.

16. In combination, a wheel body having radially extending spokes, a spacer block disposed over each spoke end, a pair of tire rims disposed on opposite sides of said block, clamping means for wedging said rims axially against opposite ends of said block, and opposed abutment means integral with said spoke end engaging opposite sides of said block to hold the same against axial movement for axially locating said block on said spoke end.

17. The combination of claim 16 further characterized in the provision of means hinging said blocks to said spoke ends for swinging movement in a plane at right angles to the wheel axis.

18. A spacer block adapted to be mounted on the spoke end of a dual wheel comprising a body portion having transversely offset boss portions having transversely alined oppositely facing abutment surfaces, and parallel end walls on said body portion extending angularly with respect to said surfaces to provide laterally offset contact points adapted to be engaged by the rims of said wheel.

19. The block of claim 18 further characterized in that one of said bosses has an opening therethrough for receiving a hinge pin carried by said spoke end.

20. The block of claim 18 wherein said bosses project normally to the plane of said body portion.

21. In combination, a wheel body having a plurality of radially extending spokes, axially oppositely directed seats on the end of each spoke, a pair of tire rims, clamping means on said seats and engaging said rims for moving them axially on said seats, spacing means between said rims having abutment surfaces on opposite faces thereof respectively engaged by said rims, said surfaces being parallel to each other and extending angularly relative to a radial plane normal to the axis of the wheel and means on said spoke end holding said spacing means against axial movement relative to said spoke end whereby said rims are spaced apart thereby and held in parallel planes normal to the axis of said wheel body.

22. In combination, a wheel body having radially extending spokes, an inboard tire rim and an outboard tire rim, spacing means carried on said spoke ends intermediate said rims, means for effecting axial pressure engagement of the inboard rim against the inboard face of said spacing means at a predetermined point on said face, means for effecting axial pressure engagement of the outboard rim against the outboard face of said spacing means at a circumferentially offset point, and means on said spoke ends holding said spacing means in a predetermined axial position thereon.

FREDERICK W. BURGER.